US008656461B2

(12) United States Patent
Kaza et al.

(10) Patent No.: US 8,656,461 B2
(45) Date of Patent: Feb. 18, 2014

(54) COPY-PASTE TRUST SYSTEM

(75) Inventors: Akhilesh Kaza, Sammamish, WA (US); Benjamin M. Westbrook, Redmond, WA (US); Jeffrey M. Cooperstein, Bellevue, WA (US); Karen E. Corby, Seattle, WA (US); Mark A. Alcazar, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1653 days.

(21) Appl. No.: 11/495,374

(22) Filed: Jul. 28, 2006

(65) Prior Publication Data

US 2008/0028442 A1 Jan. 31, 2008

(51) Int. Cl.
*G06F 21/00* (2013.01)

(52) U.S. Cl.
USPC .......... 726/4; 726/6; 726/21; 726/27; 726/28; 726/29; 726/30; 726/31; 726/32; 726/33; 713/165; 713/166; 713/167; 713/187; 713/188

(58) Field of Classification Search
USPC .......... 726/4, 25, 6, 21, 27–33; 713/165–167, 713/187–188
See application file for complete search history.

(56) References Cited

U.S. PATENT DOCUMENTS

| | | | |
|---|---|---|---|
| 5,579,521 A * | 11/1996 | Shearer et al. ................. | 719/329 |
| 5,666,214 A | 9/1997 | MacKinlay et al. | |
| 5,752,254 A | 5/1998 | Sakairi | |
| 5,801,693 A | 9/1998 | Bailey | |
| 6,366,912 B1 * | 4/2002 | Wallent et al. ..................... | 707/9 |
| 6,591,295 B1 * | 7/2003 | Diamond et al. ............. | 709/217 |
| 6,944,821 B1 | 9/2005 | Bates et al. | |
| 6,968,504 B2 | 11/2005 | Broman et al. | |
| 6,986,105 B2 | 1/2006 | Walker, Jr. | |
| 7,490,353 B2 * | 2/2009 | Kohavi ........................... | 726/22 |
| 7,950,066 B1 * | 5/2011 | Zuili ............................... | 726/33 |
| 2001/0000265 A1 * | 4/2001 | Schreiber et al. ............. | 713/201 |
| 2002/0007380 A1 | 1/2002 | Bauchot et al. | |
| 2002/0095416 A1 * | 7/2002 | Schwols .......................... | 707/10 |
| 2003/0078947 A1 * | 4/2003 | Garg et al. ..................... | 707/204 |
| 2003/0177449 A1 | 9/2003 | Rose | |
| 2005/0004986 A1 | 1/2005 | Aoki et al. | |
| 2005/0021947 A1 * | 1/2005 | Doyle et al. .................. | 713/164 |
| 2005/0203935 A1 | 9/2005 | McArdle | |
| 2005/0273600 A1 * | 12/2005 | Seeman ......................... | 713/160 |
| 2006/0117178 A1 * | 6/2006 | Miyamoto et al. ............ | 713/165 |
| 2007/0011749 A1 * | 1/2007 | Allison et al. .................. | 726/26 |
| 2007/0016771 A1 * | 1/2007 | Allison et al. ................ | 713/165 |

OTHER PUBLICATIONS

Yasushi et al., NPL document, On detection of Gapped Code Clones Using Gap Locations, IEEE 2002.*

(Continued)

*Primary Examiner* — Taghi Arani
*Assistant Examiner* — Josnel Jeudy
(74) *Attorney, Agent, or Firm* — Carole Boelitz; Micky Minhas (57) ABSTRACT

Various embodiments are disclosed relating to performing a trusted copy and paste operations between a source application and a target application. For example, a trust system may receive a paste request for pasting copied source content, and may compare a source trust level associated with the source content to a target trust level associated with a target application. In this way, for example, harmful or disruptive code may be prevented from being pasted into the target application.

16 Claims, 4 Drawing Sheets

(56) References Cited

OTHER PUBLICATIONS

Apperley, Mark, et al., "Breaking the copy/paste cycle: the Stretchable Selection Tool", http://ieeexplore.ieee.org/Ie15/6659/17796/00822057.pdf?isNumber=.

Atzeni, Paolo, et al., "Cut and Paste", http://delivery.acm.org/10.1145/270000/263678/p144-atzeni.pdf?key1=263678&key2=8218366411&coll=GUIDE&dl=GUIDE&CFID=70611978&CFTOK.

* cited by examiner

COPY-PASTE TRUST SYSTEM

BACKGROUND

The technique of copying content for later pasting into another portion of a document was included in early word processing programs, and provided users with a straightforward technique for rearranging and editing content being written or revised. Later, it became possible to copy content from one application and paste the content into another application, particularly when both applications were included in a suite of products, or were produced by the same manufacturer. For example, a user may copy the contents of a cell in a spreadsheet program, and paste the contents into a word processing program or a presentation/slideshow program In many cases, difficulties were experienced when the content was not pasted exactly as a user intended, or when the receiving or target application (into which the content was being pasted) modified the content during the paste operation. For example, a word processing application may include text having a certain formatting (e.g., text that is bolded, underlined, and having a certain size and font). When pasted into a second application, such as an email editor, then some or all of the formatting may be lost.

As a number and type of applications have developed, it has become easier for users to perform copying and pasting of different types of content between different applications, while retaining a fidelity of the content (e.g., while including all of the formatting thereof). For example, users can often copy video, audio, or other graphical information, in addition to formatted text. Additionally, even when the application or content is produced by, or associated with, a different party, it is often possible for a user to copy the content for pasting. Moreover, some copy and paste operations may involve little or no user interaction, such as when, for example, a client-side script associated with a web page is configured to interact with an associated clipboard, without user initiation or even, in some case, without user knowledge.

In many current scenarios for performing copying and pasting, a user operating a local computing device may be enabled to copy content from a remote computing device, and the copied content may include more than graphics or formatted text. For example, a user may copy content that includes active code, such as when a user copies certain content from an Internet browser. In these and similar cases, pasting of such content into an application on the user's local computing device may present a danger to the local computing device, since the code may perform an operation that is undesired by, or harmful to, the user and/or the local computing device.

Moreover, the danger and likelihood of such a result may be increased in certain environments. For example, in a managed code environment in which an environment is provided that application developers may use to write applications, instantiated objects may be created or made available in one application that may present a danger if pasted into another application. For example, in such an environment, a control or other element (e.g., a button) included in an internet application may attempt to invoke certain (potentially dangerous) actions (including actions such as re-formatting a user's hard drive), but may be prevented from doing so by corresponding security regulations. However, copying that control/element into another trusted application may thus also invoke the action (e.g., when the button is selected by a user) and succeed. In such cases, effects of the button/element may be felt within an application for which the button/element was not designed, and detrimental results may occur.

SUMMARY

By virtue of the present description, then, users are protected from dangers associated with pasting harmful content to a local computing device. For example, content may be copied, but a user may be restricted from pasting some or all of the content, depending on various factors associated with the paste operation. In this way, users need not be aware of all of the dangers of pasting certain content into certain applications, but may be automatically protected from such dangers.

In example embodiments, then, a source application may provide content to a target application based on a trust determination related to the copy/paste operation(s). For example, a user may select content from a source application to copy. The user may then select a second application where the user would like to paste the content. However, the user may only be allowed to paste that portion of the content that is deemed safe for pasting, based on a trust determination associated with the copy/paste operation(s). In this way, the user is protected from any damage or disruption that may be caused by the copied content. In example embodiments, however, the user may wish to override the trust determination, and paste otherwise-restricted portions of the content, despite the potential risks.

For example, the user may select content from a website that contains text and an active code object, where the object is configured to reformat a hard drive of a computing device. The user may select this content to copy, and may try to paste the content to a word processing application on the user's local computing device. However, based on a trust determination related to the copied content and the word processing application, the user may be prevented from pasting the potentially harmful active code object. For example, the source content may have a trust level associated therewith, either directly, or indirectly by way of a trust level of a related source application (or, in other examples, of an application domain of the source application). Meanwhile, the target application may have a trust level associated therewith, either directly, or indirectly by way of a trust level of a related application domain, or by way of a trust (e.g., permission) level of the user. Accordingly, a comparison between the trust levels may result in a prevention of the active code object being pasted, so that a danger (in this example) of having the user's local hard drive being reformatted is reduced or eliminated. The user, however, if given the proper permission or authority, may decide to perform an override and paste both the text and the active code object into the word processing application despite the potential risks.

A trust system is described that performs these and other operations, where the trust system may be distributed between a number of locations. For example, part of the trust system may run in association with the source application, while part runs in association with the target application, and part runs independently of a particular application, e.g., on a user's local computing device, and/or as part of a managed code environment. In other example, embodiments, it is possible to consolidate some or all of these distributed parts, so that, for example, the trust system may be essentially self-contained, and may interface with various source and target applications as needed to perform trusted pasting of copied content.

This summary is provided to introduce a selection of concepts in a simplified form that are further described below in the Detailed Description. This summary is not intended to

DETAILED DESCRIPTION

Figure 1:
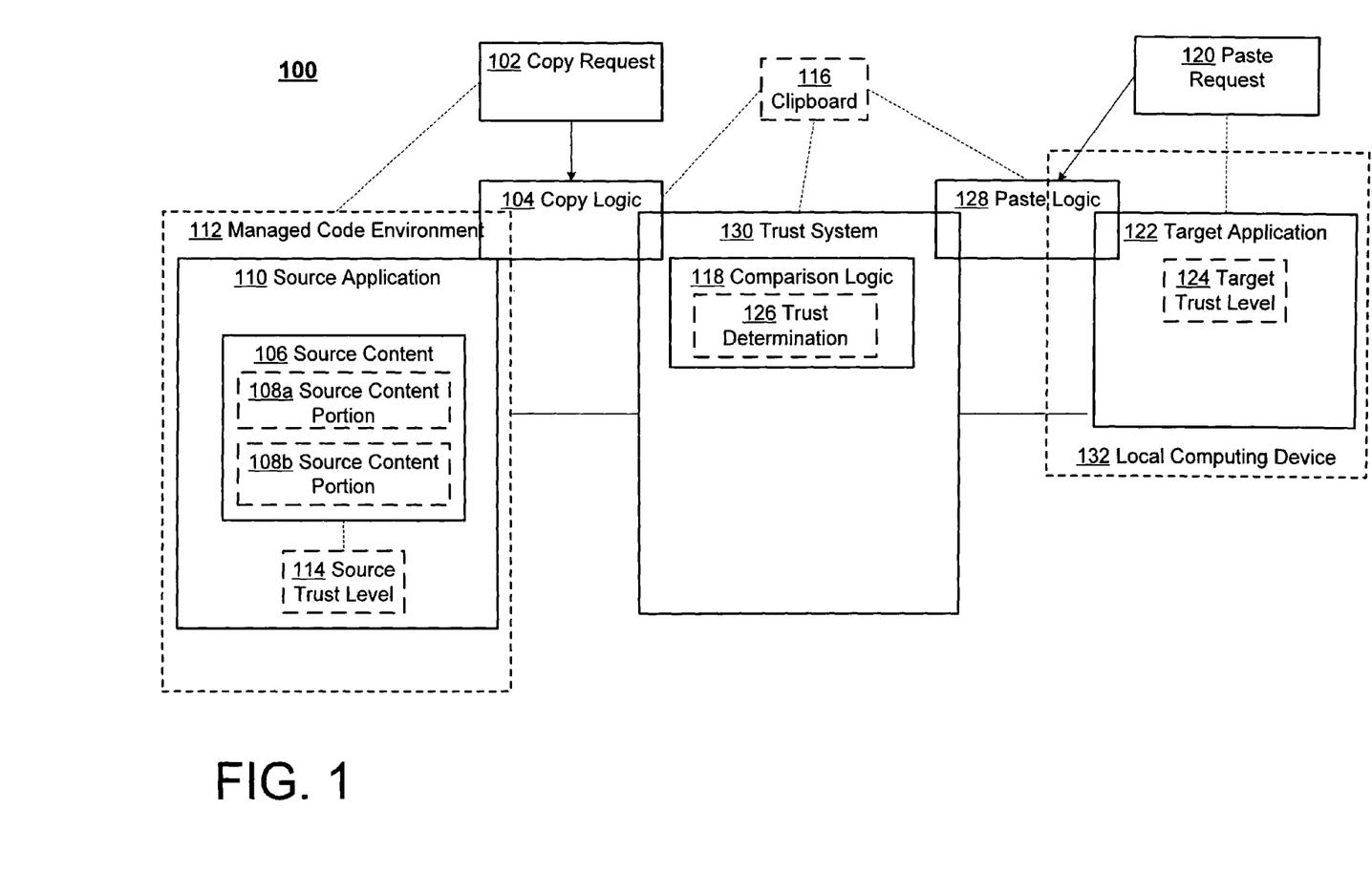
FIG. 1 is a block diagram of an example system including trust system for performing trusted copy-paste operations.

FIG. 1 is a block diagram of an example system 100 including a trust system for performing trusted copy-paste operations. The system 100 is operable, for example, to allow a user to select source content 106 from a source application 110 to copy and paste the content into a target application 122, based on a relative level of trust associated with the source content 106 (and/or the source application 110) and the target application 122. In this way, for example, dangerous or impermissible content may be limited or prevented from being pasted into the target application 122. Accordingly, for example, a danger to, or disruption of, a local computing device 132 of the user and/or the target application 122 may be reduced or eliminated.

For example, a user may find a document containing active code (e.g., an instantiated object, which may appear as a button, element, or other selector tool) on an internet site (so that the source application 110 may include, for example, a web browser), and the user may wish to copy some or all of the document. The user may then, for example, select the document to copy and try and paste the document to a target application 122, e.g., a word processing application, on the user's local computing device 132. In this regard, it should be understood that the active code may represent a danger to the local computing device 132, as the source content 106 (active code) may be enabled to perform certain actions (e.g., reformatting a hard drive of the local computing device 132). For example, a "re-format hard drive" button pasted into the target application 122 may retain that functionality when pasted (if full pasting thereof is permitted).

Thus, the system 100 may, for example, compare a source trust level 114 associated with the source application 110 (internet site) to a target trust level 124 associated with the target application 122 (word processing application) to determine how much of the document may safely be pasted, and, in particular, whether the active code may be pasted. In one example, the internet site may have a full-trust level and the document may be pasted with the highest fidelity into the word processing application (i.e., the document, complete with the active code, may be pasted). In another example, the internet site may have a lower trust level and the article may be pasted with only text (i.e. without the active code), or alternatively not at all. However in this second example, the user may decide to paste the document, complete with the active code, regardless of trust level(s), and may thus override the trust system 130 determination that the document (or portions thereof) is unsafe.

Thus, in the example of FIG. 1, a user may submit a copy request 102 to the system. The copy request 102 may include a request from the user to copy specified content from a source application 110. For example, the copy request 102 may be a keyboard stroke (i.e. ctrl+c), a menu command (i.e. selecting copy from an application menu), a mouse click (i.e. a right mouse click+copy selection), a programmed request (i.e. built within application code), a recording of a content feed, or any other acceptable method to request that content be copied. Additionally, or alternatively, the copy request 102 may include a request to cut the source content 106 from the source application 110 rather than simply copy the source content 106. For example, a user may request to cut a line of text from an internet application to be pasted into a word processing application. The copy request 102 may also be associated with a drag-and-drop command, where a user may select content from the source application 110 and drag the source content 106 to the target application 122 to be dropped.

The system 100 may include copy logic 104 that may be configured to handle the copy request 102. That is, the copy logic 104 may be logic configured to receive, implement, and/or respond to the copy request 102. For example, the copy request 102 may specify that the source content 106 from the source application 110 is to be copied. The copy logic 104 may then, for example, copy not only the source content 106 from the source application, but may also determine a source trust level associated with the source content 106. In another embodiment, the copy logic 104 may also copy other information relating to source content 106, such as, for example, the source application name. The copy logic 104, may then store the copied source content 106 in a memory, e.g., a clipboard 116, for later access.

The source content 106 may be virtually any content, from a source application, capable of being cut and/or copied. The source content 106 may, for example, include one or more of code, active code, video, audio, graphics, text, Unicode text, and/or virtually any other type of content or data. In an example embodiment, the source content 106 may include an article from an internet website, wherein the article may contain text, graphics, active code, or a link to another website. In another example embodiment, the source content 106 may be a spreadsheet containing graphs and pie charts from a spreadsheet application. In another example embodiment, the source content 106 may include content that is generally read-only, such as might be found in .pdf or .xps files.

The source content 106 may contain, or be associated with, one or more source content portions 108a,b. A source content portion 108a,b may include a discrete segment of the source content 106, or, more generally, may include at least a partial representation or aspect of the source content 106, or may include all of the source content 106. In an example embodiment, each source content portion 108a,b may assume a level of fidelity of the source content 106.

For example, the source content 106 may be an article from an internet site containing special character formatting and an instantiation of an object (i.e. active code/object). In the example embodiment, source content portion 108a may be the entire article as it appears on the website, including the special character formatting and the active object, thus assuming the highest fidelity. Then, for example, the source content portion 108b may be the article with the special character formatting and a non-instantiated object (i.e. inactive code). Of course, there may be additional or alternative source content portions, such as when only the text of the article is included, without any special character formatting or any instantiated objects. Therefore the source content portions 108a,b may for example be a way to represent and/or store the source content 106, wherein different source content portions 108a,b may correspond to various levels of fidelity, as well as to different levels of trust for downloading or pasting into other applications.

The source content 106, including source content portions 108a,b, may thus be copied from the source application 110. The source application 110 may include virtually any application with source content 106 capable of being cut and/or copied. For example, the source application 110 may include an application, a program, a website, or other source of content. In an example embodiment, the source application 110 may include an internet application, such as a managed code compliant Internet application. In another example embodiment, the source application 110 may include a live streaming data program that streams video and/or audio effects. In another example embodiment, the source application 110 may include a word processing application or a read-only document.

As just referenced, the source application 110 may operate in a managed code environment 112. The managed code environment 112 may provide a unified model that application developers may use to write applications, e.g., using a virtual machine or framework in which all compliant code may run. The managed code environment 112 may automatically handle program and/or memory management for the source application 110. The managed code environment 112 may also, for example, support any programming language that is managed code compliant. For example, a managed code environment 112, such as Windows Presentation Foundation™, may support C#, C++ or any other programming language(s) that may be managed code compliant.

The source content 106 may be associated with a source trust level 114. The source trust level 114 may be a measure of the level of trust associated with the source content 106. In an example embodiment, the source trust level 114 may be directly related to a type or nature of the source content 106 (e.g., where a first trust level is assigned for text-only, and a second trust level is assigned for instantiated objects), and may include a value within a range of possible values. In being at least indirectly associated with the source content 106, the source trust level 114 may additionally or alternatively be associated with the source application 110, or with an application domain or other context of the source application 110. For example, the source trust level 114 of the source application 110 may be 3, within a possible range of 1-5, wherein 1 may indicate an untrustworthy application and 5 may indicate the most trustworthy application.

In another example embodiment, each source content portion 108a,b of the source content 106 may be associated with a source trust level 114. For example, the source content 106 may be an article containing graphics and a link. Then, for example, source content portion 108a may be the entire article with both the graphics and the active link, with a source trust level 114 of 2. Then, for example, source content portion 108b may be the article in plain text format only, wherein no graphics are displayed and the link is deactivated, with a source trust level 114 of 5.

As referenced above, the copy logic 104 may store the copied information, including source content 110, source content portion(s) 108a,b and source trust level 114 in a memory, such as, for example, a clipboard 116. The clipboard 116 may include a memory that is local to a computing device running the source application 110, and may be used to store information that may later be accessed by the system 100. For example, upon receiving copy request 102, the copy logic 104 may copy source content 106, including source content portions 108a,b, and source trust level 114 and store this information on the clipboard 116.

The source trust level 114 may be determined, stored, and/or accessed in a number of different manners. In an example embodiment, the source trust level 114 may be stored on the clipboard 116, such that it cannot be directly accessed by other system users and/or applications outside of the system 100. While the clipboard 116 is shown as a single memory unit, this is for illustrative purposes only, as the clipboard 116 may, for example, include multiple memory units wherein each memory unit may store in whole and/or in part any information copied by the copy logic 104.

In addition to storing the source content 110, source content portions 108a,b, and source trust level 114, the copy logic 104 may also store additional information on the clipboard 116, such as source application information (i.e. where the source content 106 originated), user information, time of copy, and any other information that may be accessible by the copy logic 104. The copied information may be packaged and stored together or stored separately on the clipboard 116.

After the source content 106 and source trust level 114 are stored on the clipboard 116, the comparison logic 118 may interact with paste logic 134 in order to make, implement, or use a trust determination 126. Then, the system 100 may use the trust determination 126 to determine whether or how to paste some or all of the source content 106 into the target application 122.

The comparison logic 118 may, for example, receive a paste request 120 by way of the paste logic 134, and may determine a target trust level 124 from the target application 122 for use in making the trust determination 126. For example, a user may try to paste copied source content 106 to a word processing application (i.e. target application 122). Comparison logic 118 may then receive the paste request 120, directly or by way of the paste logic 134, determine the target trust level 124 for the word processing application, and make the trust determination 126 regarding the content.

As mentioned above, the comparison logic 118 may receive, directly or indirectly, the paste request 120 associated with a target application 122. The paste request 120 may be a request by a user to paste the source content 106 stored on the clipboard 116 to the target application 122. The paste request 120 may be a keyboard stroke (i.e. ctrl+v), a menu command (i.e. selecting paste from an application menu), a mouse click (i.e. a right mouse click+paste selection), a programmed request (i.e. built within application code), a recording of a content feed to a specified location, or virtually any other method to request that content be pasted from one location to another. The paste request 120 may also include a drag-and-drop command, where a user may select content from the source application 110 and drag the content to the target application 122 to be dropped. A user, for example, may select the source content 106 from the source application 110 to copy, highlight the content and drag the content to a target application 122 in which the user desires the content be dropped.

Upon receiving the paste request 120, comparison logic 118 may determine the target trust level 124 of the target application 122 associated with the paste request 120. The target application 122 may include any application, program, or document configured to accept a pasting of the source content 106. For example, the target application 122 may include a word processing application wherein the source content 106 may be an article copied from a website. The target trust level 124, similar to the source trust level 114, may represent a measure of a level of trust associated (either directly or indirectly) with the target application 122.

In an example embodiment, the target trust level 122 may be a value within a range of possible values. For example, the target trust level 122 of the target application 122 may be 3, within a possible range of 1-5, wherein 1 may indicate a trusting of no application and 5 may indicate fully trusting all applications. In another example embodiment, the target trust level 122 may be associated with a particular user of the system 100. For example, a first user may be associated with the highest target trust level 122 wherein any source content 106 the first user wishes to copy/paste from any source application 110 will be allowed with the highest fidelity source content portion 108*b*. Then for example, a second user may be associated with a lower target trust level 122 wherein any source content 106 he or she wishes to copy/paste may be allowed only in plain text source content portion 108*b*.

After determining the target trust level 122 and the source trust level 114 (which for example may have been stored on the clipboard 116, as described above), the comparison logic 118 may compare the target trust level 122 to the source trust level 114 to make the trust determination 126. The trust determination 126 may be a determination as to how trustworthy the source content 106 may be, and may, for example, indicate which source content portion(s) 108*a,b* may be pasted. The trust determination 126 may for example specify which source content portion 108*a,b* may be safely pasted into the target application 122. For example, a user may attempt to paste the source content 106 into target application 122. Upon receiving the paste request 120, comparison logic 118 may compare target trust level 124 with source trust level 114 to make the trust determination 126.

In an additional or alternative embodiment, trust determination 126 may indicate a set of functions and/or commands allowable by the source content 106. For example, trust determination 126 may indicate text content is acceptable, content instantiating objects is acceptable, however video and audio content are not acceptable. Then, for example, any source content 106 containing video or audio content may not be regarded as safe or acceptable and may not be pasted to the target application 122.

The trust determination 126 may then, for example, be provided to the paste logic 128. The paste logic 128 may be logic configured to determine a portion of the source content 106 to provide to the target application 122, based on the trust determination 126. The paste logic 128 may receive or retrieve the trust determination 126 from the comparison logic 118 and determine what portion of the source content 106 may be safe for pasting into the target application 112 based on the trust determination 126.

For example, the trust determination 126 may indicate a trust level of 2 or lower is acceptable. Then for example, source content 106 may for example have two source content portions 108*a,b*, wherein source content portion 108*a* may be the source content 106 with a trust level of 5 while source content portion 108*b* may be the source content 106 with a trust level of 2. Consequently, paste logic 128 may select source content portion 108*b*.

In another example embodiment, the trust determination 126 may indicate a trust level of 4 or lower is acceptable. Then for example, source content portion 108*a* may be source content 106 with a trust level of 3 and source content portion 108*b* may be source content 106 with a trust level of 2. In this example, since two source content portions are both acceptable, paste logic 128 may select the source content portion with the higher fidelity, thus paste logic 128 may select source content portion 108*a*.

In another example embodiment, the trust determination 126 may indicate text and graphics are safe, while active code objects are not. Then for example, source content 106 may have only a source content portion 108*a* which may be a document with text, graphics, and an active code object. In this example, paste logic 128 may paste only the text and graphics from source content portion 108*a*.

While the paste logic 128 may select a safe source content portion based on trust determination 126, a user may wish to override the selected source content portion. The user may decide to keep the source content 106 in its original state despite the system determination that only a portion of the source content 106 may be safe. Paste logic 128 may be configured to override the safe source content portion selected by the paste logic 128 based on the trust determination 126.

For example, a user may wish to copy a document from an internet site containing text and an instantiation of an object. Based on trust determination 126, paste logic 128 may select source content portion 108*a* as being the safe source content portion in that only text may be determined to be safe. A user however, for example, may want the instantiated object despite the system determination that the object may be unsafe. The user, with the proper permissions, may then command the paste logic 128 to select source content portion 108*b*, instead of source content portion 108*a* as selected by the paste logic 128 based on the trust determination 126, which may be the document with both text and the instantiated object.

After the paste logic 128 selects a portion of the source content 106 (either based on the trust determination 126 or on a user override), the paste logic 128 may then paste the selected source content portion into the target application 122. The paste logic 128 may be logic configured to paste at least a portion of the source content 106 into the target application 122. For example, as discussed above, only a portion of source content portion 108*a* may be determined to be safe for pasting, thus paste logic 134 may paste only that safe portion of source content portion 108*a* into target application 122. In an example embodiment, the copy logic 104 may store the selected source content portion 108*a* on the clipboard 116, and then paste logic 134 may retrieve the selected source content portion 108*a* from the clipboard 116 for pasting into the target application 122.

In some example embodiments, then, as understood from the above explanations, the source application 110 and target application 122 may each by associated with trust levels, such as "no trust," "partial trust," or "full trust," and may have an understanding with one another as to the (relative) meaning and use of these trust levels in a specific context. In such example embodiments, for example, when the source application 110 is a "full trust" application, then the source content 106 may be pasted into the target application 122, even when the target application is a "no trust" application. For example, if the source content 106 is associated with a local word processing application (assumed to be "full trust" for this example), then it may be permitted to be pasted into the target application 122 as an internet application (assumed to be "no trust"). Further in this case, for example, the source content 106 may be sandboxed in the context of the target application 122 (here, an internet application), i.e., may be constrained to run using a set of resources designed specifically to execute untested or untrusted code. As another example of a "full trust" situation, content from the local computing device 132 that is being pasted in conjunction with a user prompt (permission) may be assigned a "full trust" trust level.

Conversely, however, if the source application 110 is associated with a "no trust" trust level, then the source content 106 may not be pasted into the target application 122 when the target application 122 is a "full trust" application. For example, content from the internet application just referenced may not be pasted into the locally-running word processing application (without, for example, a specific override from the user). For example, content from such an internet application being pasted into the locally-running word processing application without a user prompt (permission) may be deemed to be a "no trust" or "partial trust" situation.

It should be understood that, the system 100 of FIG. 1 is for illustrative purposes only. FIG. 1 illustrates examples in which the system 100, or individual portions thereof, may be distributed across several systems or computing devices. For example, system 100 depicts trust system 130 to include comparison logic 118, and overlap with paste logic 128 (which also overlaps with target application 122) and copy logic 104 (which also overlaps with source application 110 and managed code environment 112). In other words, FIG. 1 is intended to illustrate, for example, that the copy logic 104 may be wholly or partially contained within either or both of the source application 110 or the trust system 130.

Similarly, the paste logic 128 may be wholly or partially contained within either or both of the target application 122 or the trust system 130. For example, both the paste logic 138 and the trust system 130 may run on the local computing device 132, while the source application 110 may be an internet application running on a remote computing device (not shown, such as a remote server), and accessed at the local computing device 132 by way of a browser (also not shown).

In other example implementations, all of the source application 110, trust system 130, and target application 122 may run on the local computing device 132, such as when the source application 110 includes client-side scripting that runs on a browser at the local computing device 132. In still other examples, such as discussed below with respect to FIG. 3, some or all of the trust system 130 may be implemented on, or in conjunction with, the clipboard 116.

Figure 2:
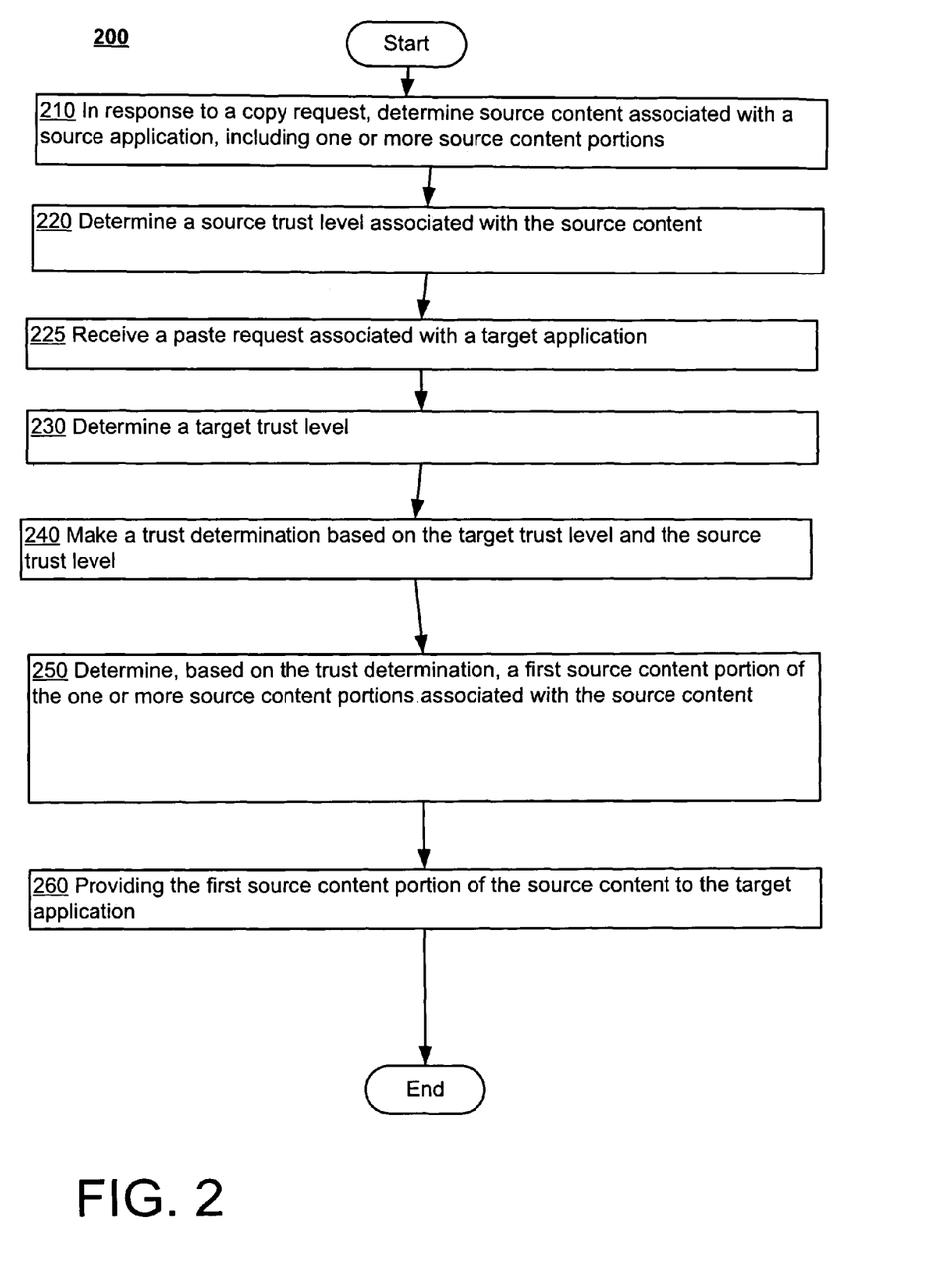
FIG. 2 is a flow chart illustrating example operations of the system of FIG. 1.

FIG. 2 is a flow chart 200 illustrating example operations of the system 100 of FIG. 1. In the example of FIG. 2, source content associated with a source application is determined in response to a copy request (210), wherein the source content includes one or more source content portions. For example, as referenced above, a user may decide to copy content from the source application 110. Thus, upon receiving the copy request 102, copy logic 104 may copy source content 106, including source content portions 108*a,b*, from source application 110, and store this information on the clipboard 116.

The source content may be associated with a source trust level, and this source trust level may be determined (220). For example, source content 106 may be associated with source trust level 114. When copy logic 104 copies source content 106 to clipboard 116, copy logic 104 may also store source trust level 114 in association with source content 106 on clipboard 116. In an example embodiment, source trust level 114 may be stored as a private data member on clipboard 116.

A paste request may then be received, the paste request associated with a target application (225). For example, a user of the target application 122 may initiate the paste request 120, using one of the techniques described above.

A target trust level may then be determined (230). For example, after a user selects source content 106 to copy, the user may attempt to paste the source content 106 to a target application 122. Consequently a paste request 120 associated with the target application 122 may be received by trust system 130, as just described. Then, for example, comparison logic 118 may determine the target trust level 124 associated with the target application 122 associated with the paste request 120. In an alternative embodiment, a user may drag source content 106 from source application 110 and may try to drop the source content 106 into target application 122, thus also generating paste request 120.

After determining a target trust level, a trust determination may be made based on the target trust level and the source trust level (240). For example, comparison logic 118 may retrieve the source trust level 114 from clipboard 116 and compare source trust level 114 to target trust level 124 to make trust determination 126, as described above.

Based on the trust determination, a first source content portion of the one or more source content portions associated with the source content may be determined (250). For example, paste logic 128 may determine which source content portion 108*a* or 108*b* is safe for providing to target application 122, based on trust determination 126.

Finally, the first source content portion of the source content may be provided to a target application (260). For example, paste logic 128 may select source content portion 108*a* and then may paste source content portion 108*a* of source content 106 into target application 122.

Figure 3:
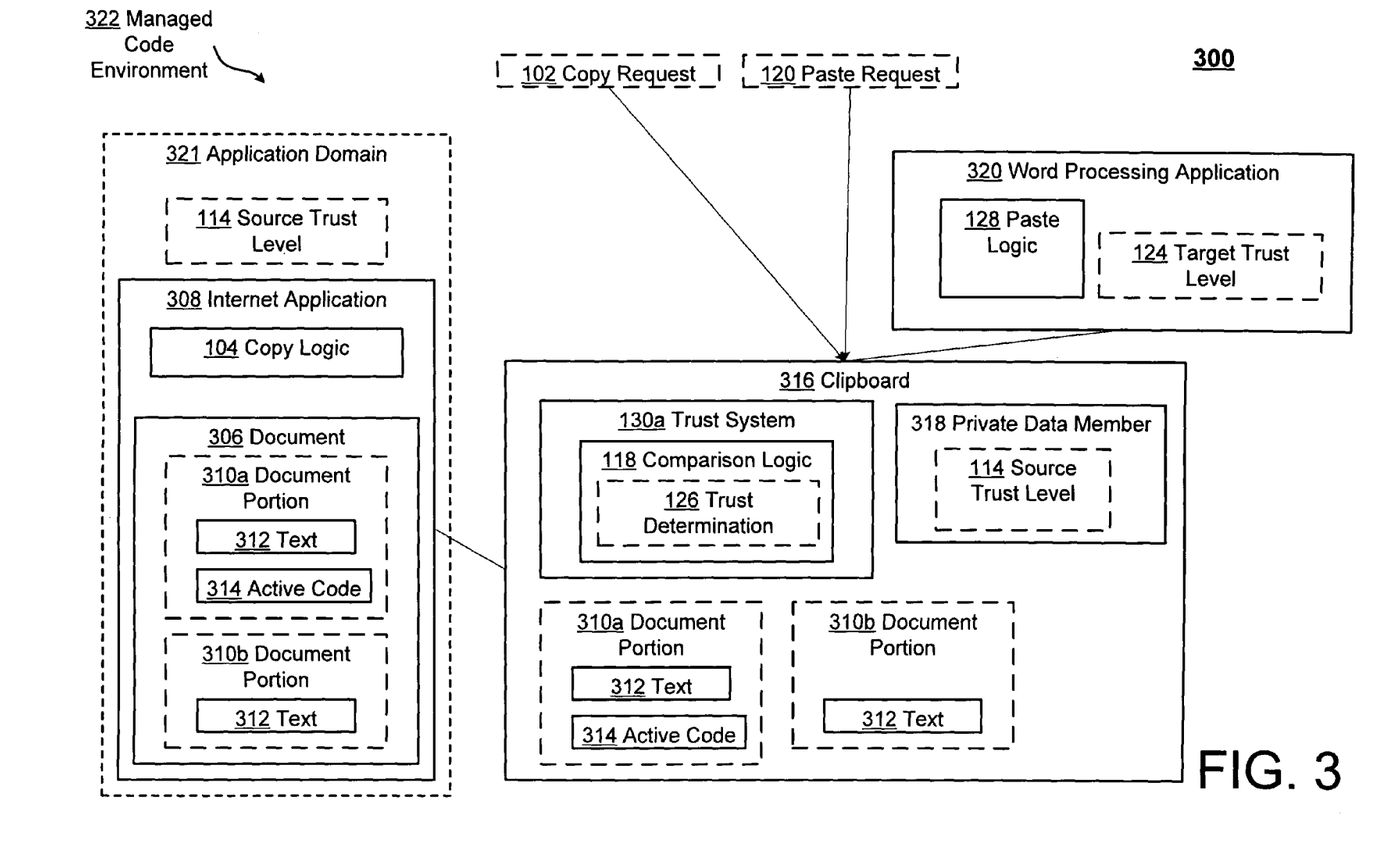
FIG. 3 is an example embodiment of the system 100 of FIG. 1 in a managed code environment.

FIG. 3 is an example embodiment of the system 100 of FIG. 1 in a managed code environment 322. In the example of FIG. 3, the copy request 102 may be received by the trust system 130*a*, where the trust system 130*a* is representing a variation of the trust system 130 of FIG. 1. Specifically, in the trust system 130*a*, the comparison logic 118 is included in the trust system 130*a*, but the copy logic 104 is included in an internet application 308, while the paste logic 128 is included in a word processing application 320, as shown. By distributing the various components in this manner, the trust system 130 may have wide applicability and be available to a large number of users, and may operate in a redundant and reliable manner.

The copy request 102 may include a user selecting content from a source application 308, such as an internet application of the managed code environment, and copying the selected content for later pasting to a target application, as described above with reference to FIG. 1. As also referenced above, the copy request 102 may include included as part of a drag-and-drop request. For example, a user may select text from a first document of the internet application 308, and drag the text to a word processing application 320 to be dropped. In an example embodiment, the drag-and-drop request may include the copy request 102 and the paste request 120. For example, the copy request 102 may include a request to copy selected information from the source application 308. Then, for example, the paste request 120 may include a request to paste (i.e. drop) the selected content into the target application 320.

As discussed above, the trust system 130*a* may be aware of the copy request 102. For example, the trust system 130*a* may receive the copy request 102, and determine which content is to be copied, receive the paste request 120, make a trust determination based on the source content and target application, and then paste the source content, based on the trust determination. In FIG. 3, the copy logic 104 may handle the copy request 102. For example, the copy request 102 may include a request to copy a document 306 from the internet application 308. The copy logic 104 may then copy the document 306, including any document portions 310*a,b* and a source trust level 312, from the internet application 308, or from an application domain 321 associated therewith.

The internet application 308 may include a program, code, applet, website, or other application associated with the internet that may provide content configured to be cut, copied and/or dragged-and-dropped. For example, the internet application 308 could be an internet website providing a document 306, or portion thereof, that may be copied or dragged-and-dropped by a user.

The document 306, for example, may be a document containing text 312 and active code 314. The document 306 may also include one or more document portions 310*a,b*. A document portion 310a,b may be at least a partial representation of the document 306. A document portion 310a,b may assume a level of fidelity of the document 306. For example, the document 306 as requested to be copied by the copy request 102 may contain both text 312 and active code 314. Then, for example, the document 306 may include the two document portions 310a,b. Document portion 310a may assume a high fidelity of the document 306, and may include both the text 312 and active code 314 of the document 306. Document portion 310b may assume a lower fidelity of the document 306 and may include only the text 312 of the document 306.

In another embodiment, a document portion 310a,b may include one or more formats of how document 306 may be stored on internet application 308. For example, if document 306 contained only text 312, then document portion 310a may include the text 312 in a rich text format (RTF), while document portion 310 may include the text 312 in a Unicode text format.

The active code 314 may be a set of code of the document 306 configured to perform an action and/or function. For example, the active code 314 could be a link to another website, or perhaps an object that if instantiated may reformat a user's local machine. In an example embodiment, the active code 314 may include eXtensible Markup Application Language (XAML) code. XAML code generally refers to code based on the eXtensible Markup Language (XML), and that is used to support graphics-intensive environments. The XAML code, for example, may create and instantiate a live object on a target application, such as the word processing application 320, when copied and pasted thereto. For example, the active code 314 may create and instantiate an object, perhaps represented to the user as a button or other visual element, that may reformat a hard drive.

The document 306 may also be associated with a source trust level 114. The source trust level 114, as discussed above, may be a measure of the level of trust associated with the document 306. Alternatively or additionally, the source trust level 114 may be associated either directly or indirectly with a source application 308 of the document 306, with one or more document portions 310a,b, or with a user. For example, if internet application 308 was a Microsoft™ application, then for example all Microsoft™ applications may be fully trusted and associated with the highest source trust level 114. In another example, perhaps a user is a guest user of the system 300, the user may always be associated with the lowest trust level 114. Also as discussed above, the source trust level 114 may be a value on a possible range of trust values, may be a set of allowed functions, and/or may be any other applicable measure of trust.

In the example of FIG. 3, the internet application 308 is associated with an application domain 321, which is associated with the source trust level. The application domain 321 refers to an object and/or process that is associated with an application, e.g., the internet application 308, and that is stored and that contains information about its associated application(s). Thus, the application domain provides a convenient technique for associating a (source) trust level with the source application 308, since, e.g., the copy logic 104 may simply store the copied content (e.g., document 306) to the clipboard 316 and may obtain and store the source trust level from the application domain 321, as shown. Thus, the source trust level 114 is associated with the source content 306, inasmuch as the source content is part of the source application 308 and therefore part of the application domain 321. Moreover, the target application 320 also may be associated with the application domain 321, or with a different (i.e., its own) application domain.

As shown in FIG. 3, some or all of the trust system 130a may be implemented on, or in conjunction with, the clipboard 316. In this way, for example, the trust system 130a may easily receive and respond to the paste request 120 by populating the private data member 318 with the source trust level 114 (and/or the source content portions 310a, 310b).

Thus, upon receiving the drag-and-drop 302 request, the copy logic 104 may copy document portions 310a,b and source trust level 114 from internet application 308 and application domain 321, respectively, and store this information on the clipboard 316. The copy logic 104, as discussed above, may also store additional information on the clipboard 316 as well, for example, the name of the source of the document 306, user information, and or any other accessible information.

As discussed above, the clipboard 316 may be a memory unit configured to store information relating to the system 300. As will be appreciated, the clipboard 316 may have associated application program interfaces (APIs) that are used (e.g., by corresponding APIs of the source application, target application, and/or trust system 130a) to call into, and provide data out from, the clipboard 316.

Thus, for example, the clipboard 316 may store document portions 310a,b. The clipboard 316 may also store the source trust level 114 as a private data member 318. The private data member 318 may be a memory unit associated with the clipboard that may not be accessible to systems and/or programs outside of trust system 130a. For example, if the source trust level 114 has been stored on the private data member 318 of the clipboard 316, then for example a user may not be able to access the source trust level 114. For example, the user may paste document portion 108b to a target application (that is stored outside of private data member 318), but not source trust level 114 that is stored inside private data member 318.

After the copy logic 104 stores the information associated with the copy request 102 on the clipboard 116, the paste request 120 may cause the comparison logic 118 of the trust system 130a to make a trust determination 126. As discussed above, upon receiving the paste request 120, the comparison logic 118 may make a determination as to the trustworthiness of the document 306 based on the source trust level 114 and a target trust level 124 for the target application 320.

For example, the comparison logic 118 may retrieve the source trust level 114 from the clipboard 116 and the target trust level 124 from the target application 320 (which in this example may be a word processing application, as shown). As discussed above, the comparison logic 118 may compare the source trust level 114 to the target trust level 124 to make a trust determination 126. The trust determination 126, as discussed above, may be a determination as to the safety or trustworthiness of the document 306 to be copied (or cut) and pasted. The trust determination 126, for example may include a value of trust amongst a range of possible values, may include a set of allowable content, a function for determining trust, or may include any other acceptable measure of trust.

In some example embodiments, all applications within the managed code environment 322 may be assigned a trust level, such as "no trust," "partial trust," or "full trust." In this way, the trust system 130a may make fast trust determinations within the managed code environment 322.

In another example embodiment, if two or more portions of document 306 are deemed safe based on the trust determination 126, then the paste logic 128 may select the document portion that assumes the highest fidelity. For example, if trust determination 126 indicates that both the text 312 and active code 314 from the internet application 308 may be safely pasted, then both document portion 310a and document portion 310b may be safely pasted. As such, the paste logic 128 may select document portion 310a for pasting, as document portion 310a may assume a higher fidelity in including both text 312 and active code 314.

As discussed above, the paste logic 128 may then select a document portion 108a,b to paste to the word processing application 320 based on the trust determination 126. The paste logic 128 may be configured to select and paste a portion of the document 306 to the word processing application 320, based on the trust determination 126. For example, trust determination 126 may indicate that only the text 312 may be safely pasted from document 306 to word processing application 320. Then for example, the paste logic 128 may select document portion 310b from the clipboard 116 to be pasted, as document portion 310b contains only text 312 while document portion 108a contains both text 312 and active code 314.

While the paste logic 128 may select a document portion 310a,b to paste based on the trust determination 126, a user may choose to override the selection. As discussed above, the paste logic 128 may be configured to allow a user to override a selection of a portion of the document 306 based on the trust determination 126. For example, paste logic 128 may select document portion 310b as being safe because trust determination 126 may indicate that the active code 314 is unsafe. A user, however, may decide the user still wants the active code 314 despite the trust system's determination of being unsafe, and, as such, the user may override the selection of document portion 310b, in favor of document portion 310a.

The paste logic 128 may then paste the selected document portion 310a,b (either selected based on the trust determination 126 or by a user override) to the word processing application 320. The word processing application 320 may be any word processing application configured to accept a paste of at least a portion of the document 306. For example, the word processing application 320 may be configured to accept text 312 and/or active code 314 content.

Trust system 130a, clipboard 316, and word processing application 320 may all be within the managed code environment 322, as shown. As discussed above, a managed code environment may automatically handle program and/or memory management. The managed code environment 112 may also, for example, support any programming language that is managed code compliant and provide a unified programming model to write applications using managed code. For example, a managed code environment 322, such as Avalon™, may support C#, C++ or any other programming language(s) that may be managed code compliant. Also an application within the managed code environment 322 may have permissions an application outside the managed code environment 322 does not. For example, as discussed above, the word processing application 320 may be able to override the trust system 130a determination that document portion 310a is unsafe and paste document portion 310a regardless of the trust determination 126, while an application outside of the managed code environment 322 may not have such permission, or may not be allowed to use the trust system 130a at all.

Figure 4:
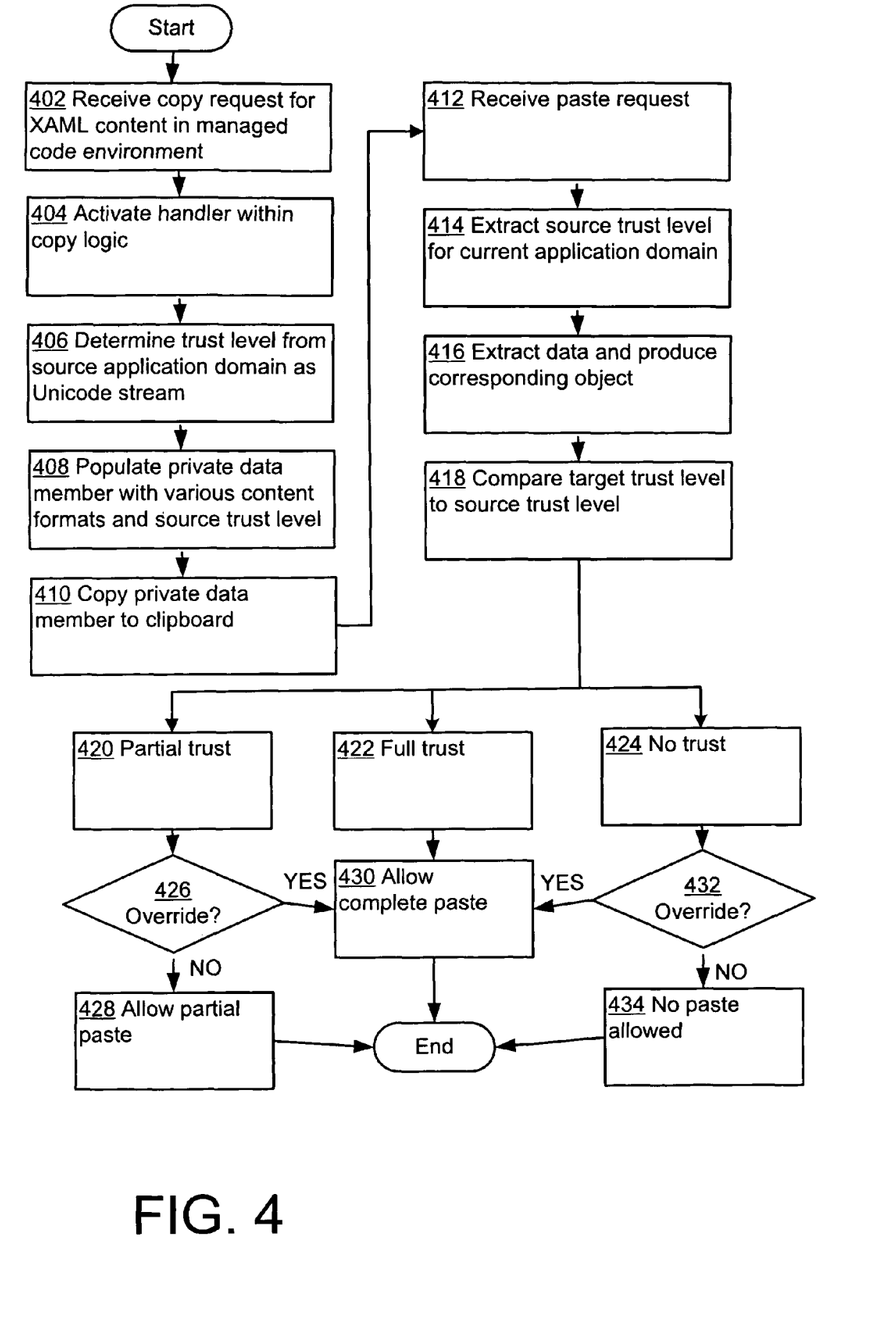
FIG. 4 is a flow chart illustrating example operations used by the system of FIG. 3.

FIG. 4 is a flow chart 400 illustrating example operations used by the system of FIG. 3. More specifically, FIG. 4 is a flow chart 400 illustrating example operations used by the system of FIG. 3 in making a trust determination 126 and selecting a portion of the document 306 to paste to the word processing application 320. In the example of FIG. 4, a copy request is received for XAML content in a source application of a managed code environment (402), which may include the active code 314 of the source application 308 of the managed code environment 322 of FIG. 3, and where the copy request 102 may be any of the copy request types mentioned herein, or other types.

The copy request results in activation of a handler within, or associated with, the copy logic 104 (404), which is configured to determine a source trust level from the source application domain 321 (406). For example, the handler may determine the source trust level 114 as one of the formats to be copied to the clipboard 316, which may include a Unicode stream representing XML code that is obtained by serializing a trust level associated with the application domain 321, so that various permissions (or lack thereof) may be serialized into the same stream.

In some cases, the presence of a permission set associated with the source trust level 114 may limit copying and pasting across two (source/target) applications from the same application domain and associated with the same permissions (i.e., trust levels). Thus, in such circumstances, these permissions may be removed (trust levels are reduced). For example, if the source application 308 (or 110) is launched from the local computing device 132 or local file path (e.g., <directory>\<application>), then the handler may strip permission(s) for the site of origin. Similarly, if the source application was launched from the internet (or intranet or other network location, e.g., using http), then the handler may strip permissions for that site of origin.

The private data member 318 may then be populated with the various content formats and the source trust level 114 (408), and copied to the clipboard 316 (410). For example, the trust level (permission set) may be serialized into Unicode stream within the private data member 318 and copied to the clipboard 316 by the handler within the copy logic 104.

Then, or at a later time, a paste request may be received (412), such as the paste request 120 requesting the pasting of the source content (document) 306. The source trust level 114 for the application domain 321 is then extracted (414). For example, the trust system 130a (e.g., the comparison logic 118) may call into the clipboard 316 to extract the source trust level 114, as well as the source content data, so as to deserialize the permission/trust level and thereby produce a corresponding data object (416).

Accordingly, a target trust level and a source trust level may be compared (418), e.g., by detecting the target trust level (permission set) as a subset of the source trust level (permission set), so as to determine an extent to which the paste is permitted, if at all. As already described, a number of possibilities are possible, and in the example of FIG. 4, the trust system 130a may make a determination of either partial trust (420), full trust (422), or no trust (424). For example, in the case of partial trust or no trust, the trust system 130a may return a wrapped data object that is configured to limit the target application 320 from reaching the, in this case, XAML content of the document 306 (or the source trust level 114).

If an override is allowed (426, 428) for the partial or no trust scenarios, then the target application may call back to the trust system 130a to obtain the source content in its entirety (e.g., including the active XAML code 314). Of course, a full trust situation would also result in an allowance of a full or complete pasting of the source content (430). Otherwise, if no override is allowed, then either a partial (428) or no (434) paste may be allowed.

Table 1 describes specific example implementations of the above described scenarios of FIG. 4. In Table 1, it is assumed that a managed code environment exists and that, as described above, various trust levels are present within that environment. However, as should be apparent, copying and pasting also may occur across the managed code environment and another application that is outside of the managed code environment (as in the right-most column of Table 1).

In Table 1, then, the first row indicates results when source content 306 is copied (or cut and copied) from a partial trust application. As shown, if the trust level of the target application is the same as the source application, then active code, such as XAML, may be pasted. However, the pasting may be restricted to plaintext if the target application has a higher (full) trust level, or may be dependent on the target trust level if the target application is outside of the managed code environment.

The second row of Table 1 indicates that if a source application 308 is a full trust application, then XAML content may be pasted anywhere within the managed code environment. Or, if the target application is outside of the managed code environment, then the paste will generally depend on the target trust level thereof.

TABLE 1

|  | Paste into partial trust target application | Paste into full trust target application | Paste into application external to managed code environment |
|---|---|---|---|
| Copy from partial trust source application of managed code environment | Plaintext, XAML put on clipboard Result: XAML pasted | Plaintext, XAML put on clipboard Result: plaintext pasted | Plaintext, XAML put on clipboard Result: dependent on target application |
| Copy from full trust target application of any content in managed code environment | Plaintext, rtf, XAML put on clipboard Result: XAML pasted | Plaintext, rtf, XAML put on clipboard Result: XAML pasted | Plaintext, rtf, XAML put on clipboard Result: dependent on target application |

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A system comprising:
   copy logic configured to determine source content from a source application, wherein the source content includes a plurality of source content portions, wherein each source content portion has an associated source trust level, the copy logic further configured to store the source content in a memory, wherein the source application operates in a managed code environment;
   a computing device comprising comparison logic configured to make a trust determination responsive to a paste request, the trust determination based on the source trust level and a target trust level associated with a target application, the computing device further comprising the memory; and
   the computing device further comprising paste logic configured to determine, based on the trust determination, a first source content portion of the plurality of source content portions to provide to the target application and a second source content portion of the plurality of source content portions to block from the target application based on a determination that the second source content portion comprises an active code object and the target application is external to the managed code environment, wherein the trust determination indicates that the second source content portion is not safe for providing to the target application, and the paste logic is configured to override the trust determination and provide the second source content portion of the source content to the target application, wherein the copy logic is implemented at least in part in association with the comparison logic and separately from the source application, and is configured to determine the source content and source trust level from a memory associated with the source application.

2. The system of claim 1 wherein the copy logic is implemented in association with the source application, and is configured to copy the source content from the source application for storage with the source trust level.

3. The system of claim 1 wherein the copy logic is configured to store the source content and the source trust level in association with a clipboard.

4. The system of claim 1 wherein the copy logic is configured to determine one or more of the source content and source trust level in response to a drag-and-drop operation between the source application and the target application.

5. The system of claim 1 wherein the copy logic is configured to determine the source content from the source application or from an application domain of the source application.

6. The system of claim 1 wherein the comparison logic is configured to determine the target trust level and make the trust determination based on the source trust level and the target trust level.

7. The system of claim 1 wherein the paste logic is configured to paste the source content into the target application, based upon the trust determination.

8. The system of claim 1 wherein the comparison logic and the paste logic are implemented in association with the target application, and configured to determine the trust determination and paste the first content portion of the source content based upon the trust determination.

9. A method comprising:
   copying source content from a source application, wherein the source application operates in a managed code environment;
   using a computing device, associating a first source content portion of the source content with a first source trust level using a memory associated with the source application; and
   using the computer device, associating a second source content portion of the source content with a second source trust level; and
   using the computer device, responsive to a paste request and based on the associated trust level, storing the first source content portion and blocking storage of the second source content portion based on a determination that the second source content portion comprises an active code object and a target application is external to the managed code environment, wherein the determination indicates that the second source content portion is not safe for providing to the target application, and the determination is overridden so that the second source content portion of the source content is provided to the target application, wherein copying is performed separately from the source application.

10. The method of claim 9 wherein the copying comprises:
copying the source content from the source application in response to a copy request.

11. The method of claim 9 wherein the copying comprises:
copying the source content from the source application in response to a drag-and-drop operation between the source application and a target application.

12. The method of claim 9 wherein the associating comprises:
associating the source trust level with the source content based on one or more of the source application, a source application environment, a source application domain, or the managed code environment of the source application.

13. A method comprising:
using copy logic, determining source content from a source application, wherein the source content includes a plurality of source content portions, wherein each source content portion has an associated source trust level, the copy logic further configured to store the source content in a memory, wherein the source application operates in a managed code environment;
using comparison logic, making a trust determination responsive to a paste request, the trust determination based on the source trust level and a target trust level associated with a target application, a computing device further comprising the memory; and
determining, based on the trust determination, a first source content portion of the plurality of source content portions to provide to the target application and a second source content portion of the plurality of source content portions to block from the target application based on a determination that the second source content portion comprises an active code object and the target application is external to the managed code environment, wherein the trust determination indicates that the second source content portion is not safe for providing to the target application, and the trust determination is overridden so that the second source content portion of the source content is provided to the target application, wherein the copy logic is implemented at least in part in association with the comparison logic and separately from the source application, and is configured to determine the source content and source trust level from a memory associated with the source application.

14. The system of claim 1, wherein the associated source trust level of each source content portion is stored as private data members that are not accessible to the target application.

15. The system of claim 1, wherein the source content and the active code object are obtained from a web browser.

16. The system of claim 1, wherein the first content portion comprises content in a plaintext format with no graphics to be displayed and no active links.

* * * * *